(12) United States Patent
Maruyama

(10) Patent No.: US 8,210,594 B2
(45) Date of Patent: Jul. 3, 2012

(54) IN-VEHICLE COMPONENT ATTACHMENT STRUCTURE

(75) Inventor: Kazuhiko Maruyama, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 357 days.

(21) Appl. No.: 12/446,391

(22) PCT Filed: Oct. 11, 2007

(86) PCT No.: PCT/JP2007/069887
§ 371 (c)(1),
(2), (4) Date: Apr. 20, 2009

(87) PCT Pub. No.: WO2008/053682
PCT Pub. Date: May 8, 2008

(65) Prior Publication Data
US 2010/0320805 A1 Dec. 23, 2010

(30) Foreign Application Priority Data
Oct. 27, 2006 (JP) .................................. 2006-292175

(51) Int. Cl.
*B60J 7/00* (2006.01)
(52) U.S. Cl. .................................... 296/96.17; 15/250.3

(58) Field of Classification Search ............... 296/96.17; 15/250.3
See application file for complete search history.

(56) References Cited

U.S. PATENT DOCUMENTS

| 6,505,376 B1 * | 1/2003 | Kagawa .................... 15/250.31 |
| 6,923,591 B2 * | 8/2005 | Egner-Walter et al. ......... 403/24 |
| 2002/0083544 A1 * | 7/2002 | Masuda .................... 15/250.31 |

FOREIGN PATENT DOCUMENTS

| JP | 2000-128022 A | 5/2000 |
| JP | 2000-233720 A | 8/2000 |
| JP | 2003-025966 A | 1/2003 |

* cited by examiner

*Primary Examiner* — Joseph Pape

(57) ABSTRACT

An in-vehicle component attachment structure 8 includes a front body inner section 5 and a reinforcement panel 6. The front body inner section 5 includes a second wall 17 fixed on the vehicle side, and an attaching part 18 integratedly formed by bending the second wall 17. The reinforcement panel 6 is arranged near the attaching portion 18 and fixed on a side of the second wall 17 in the vicinity of the attaching portion 18, and fixed making surface contact with this side. The attaching portion 18 includes an attaching surface 22 to which a wiper motor unit is fastened and fixed. The attaching surface 22 is at a slant relative to the second wall 17 at a predetermined angle in accordance with the fastening direction of the wiper motor unit.

4 Claims, 5 Drawing Sheets

IN-VEHICLE COMPONENT ATTACHMENT STRUCTURE

TECHNICAL FIELD

The present invention relates to an attachment structure for an in-vehicle component that can be attached to a body panel.

BACKGROUND ART

It is well known that a reinforcement panel such as a backboard is joined to and arranged on the rear face of a body panel in the attachment structure for an in-vehicle component, such as a wiper motor to be attached to the body panel, in order to improve the supporting strength of the in-vehicle component to the body panel. Attachment of the in-vehicle component to the body panel is carried out by passing a fastening member such as a bolt through the in-vehicle component, the body panel, and the reinforcement panel in a state where the body panel is sandwiched between the attaching portion of the in-vehicle component and the reinforcement panel.

Patent Document 1: JP-A 2000-233720

DISCLOSURE OF INVENTION

Problem to be Solved by the Invention

However, with the above-given in-vehicle component attachment structure, if an obstacle, such as the body panel or the like, is placed on an extension line out to the fastening member in the reverse passing direction, setting a fastening tool on the fastening member may be difficult. There may be cases where the attachment operation of the in-vehicle component to the body panel becomes complicated.

This inconvenience can be avoided by setting only the attaching part (hereafter called an attaching portion) of the body panel by which the in-vehicle component is fastened and fixed at an angle at which the fastening tool can be set. However, if the attaching portion is made to slant relative to the peripheral area (hereafter called a general portion), a reinforcement panel arranged at the rear face of the attaching portion and the general portion must be formed in a shape corresponding thereto. Such reinforcement panel can be easily made into a complicated shape having a rugged surface, which may in some cases cause an increase in cost needed for manufacturing of the reinforcement panel.

Moreover, an aperture may be formed in a portion of the body panel at which the in-vehicle component is to be fastened and fixed to attach the reinforcement panel with a rugged surface to the aperture. However, since processes, such as waterproofing which closes a gap formed between the body panel and the reinforcement panel, will increase if an aperture is formed in the body panel, this leads to reduction in workability of the in-vehicle component attachment. Moreover, it may lead to harmful results such as rain water entering the vehicle interior.

Therefore, the present invention aims to provide an attachment structure for an in-vehicle component allowing attachment thereof to a body panel at a preferred angle without decrease in supporting strength.

Means of Solving the Problem

The in-vehicle component attachment structure according to the present invention, which should accomplish the above-given purpose, includes a body panel and a reinforcement panel. The body panel includes body panel comprising a general portion fixed on the vehicle side and an attaching portion integratedly formed by bending the general portion. The reinforcement panel is arranged on a side of the general portion in the vicinity of the attaching portion, and fixed making surface contact with this side. The attaching portion includes an attaching surface to which an in-vehicle component is fastened and fixed. The attaching surface is at a slant relative to the general portion at a predetermined angle in accordance with the fastening direction of the in-vehicle component.

With the above-given structure, an attaching portion integratedly formed by bending the general portion is provided to the body panel, and the attaching surface to which the in-vehicle component can be fastened and fixed is provided on the attaching portion. The reinforcement panel is arranged in the vicinity of the attaching portion, and fixed making surface contact with a side of the general portion. The attaching surface is at a slant relative to the general portion at a predetermined angle in accordance with the fastening direction of the in-vehicle component. Namely, since the reinforcement panel is arranged in a state making contact with the general portion near the attaching portion to which the in-vehicle component is fastened and fixed, this reinforcement panel makes it possible to reinforce the supporting strength of the in-vehicle component. This, therefore, allows improvement of the supporting strength of the in-vehicle component for the body panel without arranging a reinforcement plate on a side of the attaching portion.

Moreover, since the reinforcement panel is arranged in a position (general portion) not interfering with the attaching portion, the shape of the attaching portion is not influenced by that of the reinforcement panel. Therefore, since it is possible to appropriately establish an angle of gradient for the attaching surface of the body panel, the in-vehicle component may be attached to the body panel at a desired angle. Moreover, since the reinforcement panel may be an approximate planar shape along the general portion, increase in cost necessary for manufacturing the reinforcement panel may be suppressed.

Alternatively, the body panel may include a hole formed at a predetermined position of the general portion in the vicinity of the attaching portion and through which a part of the in-vehicle component passes, and the reinforcement panel may be arranged around the hole.

With the above-given structure, the reinforcement panel is arranged in a position around the holes and near the attaching portion. Namely, since each of the attaching portions and the periphery of the hole of the body panel are reinforced by the reinforcement panel, the supporting strength of the in-vehicle component for the body panel may be sufficiently ensured even when the hole is formed in the body panel. Therefore, a part of the in-vehicle component may be positioned via the hole without reducing the supporting strength of the in-vehicle component for the body panel.

Moreover, multiple attaching portions may be provided to the body panel, and each of extensions extending between two adjacent attaching portions of the multiple attaching portions may be provided to the reinforcement panel.

With the above-mentioned structure, each of the extensions of the reinforcement panel is arranged between two adjacent attaching portions of the multiple attaching portions. Therefore, the in-vehicle component may be more favorably attached to the body panel since the multiple attaching portions are reinforced by the extensions, respectively.

Effects of the Invention

According to the present invention, an in-vehicle component may be attached at an angle to a body panel by a simple structure without reducing supporting strength of the in-vehicle component.

DESCRIPTION OF REFERENCE NUMERALS

1: Vehicle
5: Front body inner section (body panel)
6: Reinforcement panel
7: Wiper motor unit (in-vehicle component)
8: Attachment structure of in-vehicle component
17: Second wall (general portion)
18: Attaching portion
19: Hole
22: Attaching surface
27: Extension
31: Main body (part of the in-vehicle component)

BEST MODE FOR CARRYING OUT THE INVENTION

Figure 1:
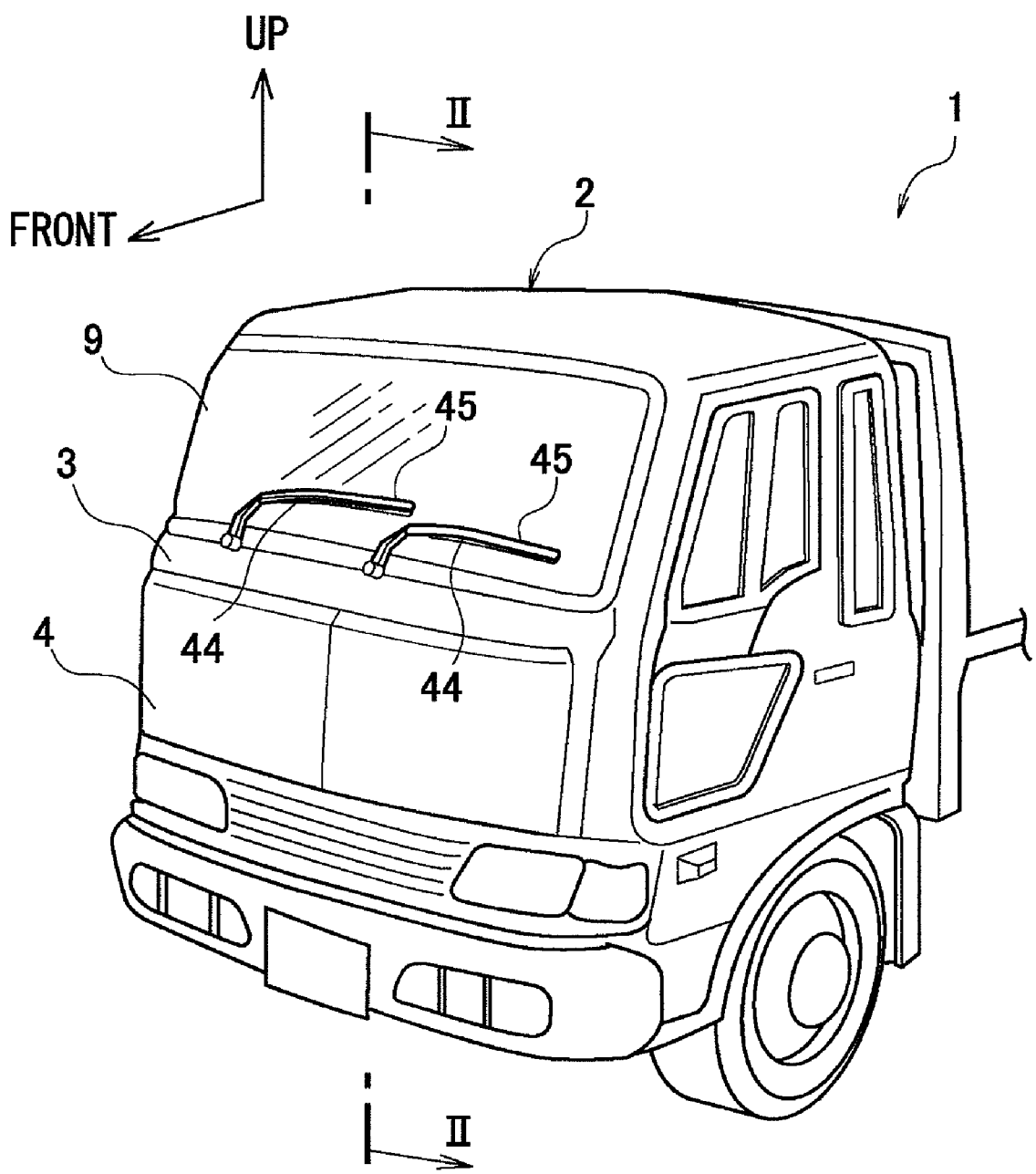
FIG. 1 is a perspective view of a vehicle according to an embodiment.
Figure 2:
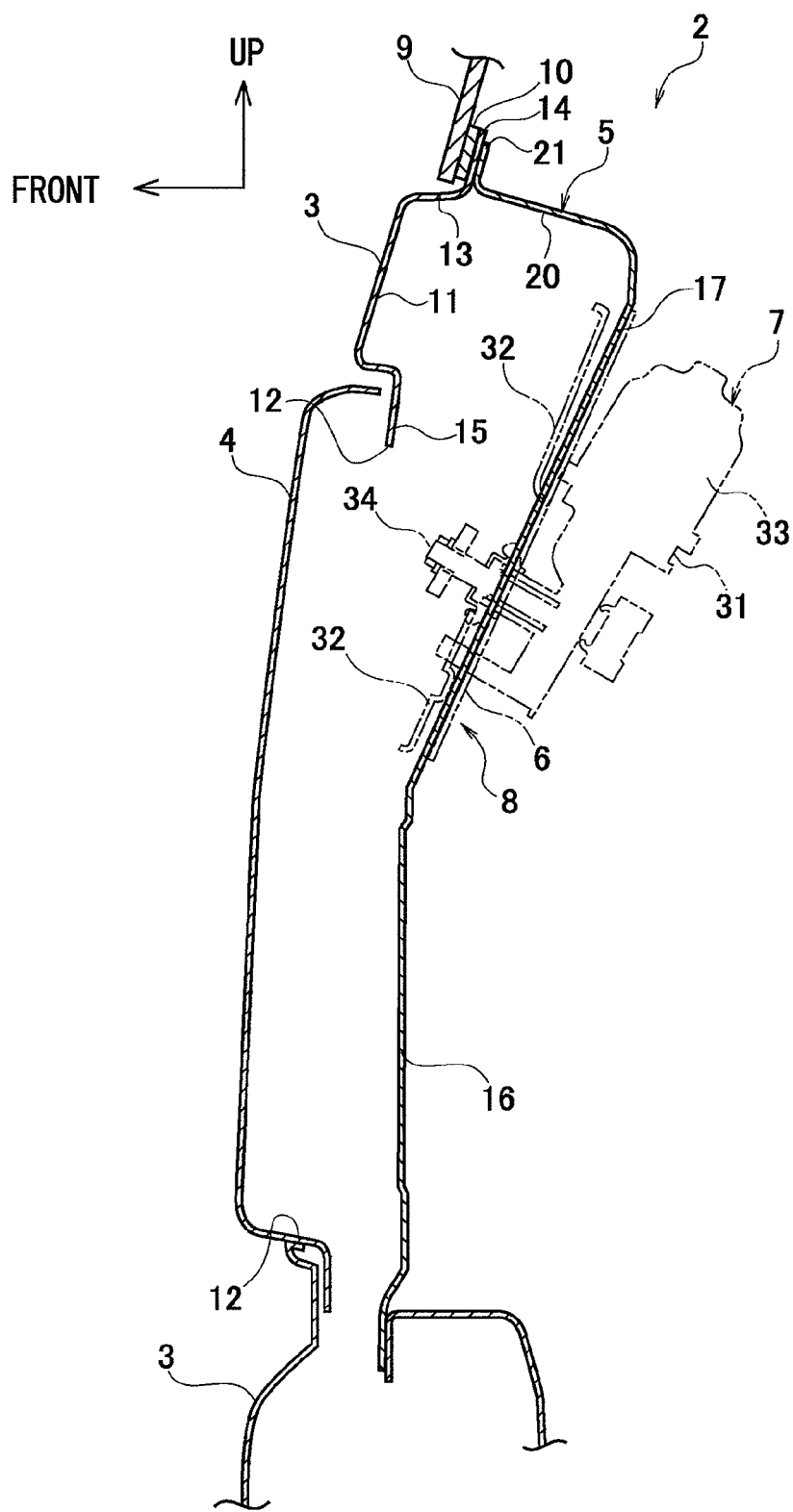
FIG. 2 is a cross section viewed from line II-II of FIG. 1.
Figure 3:
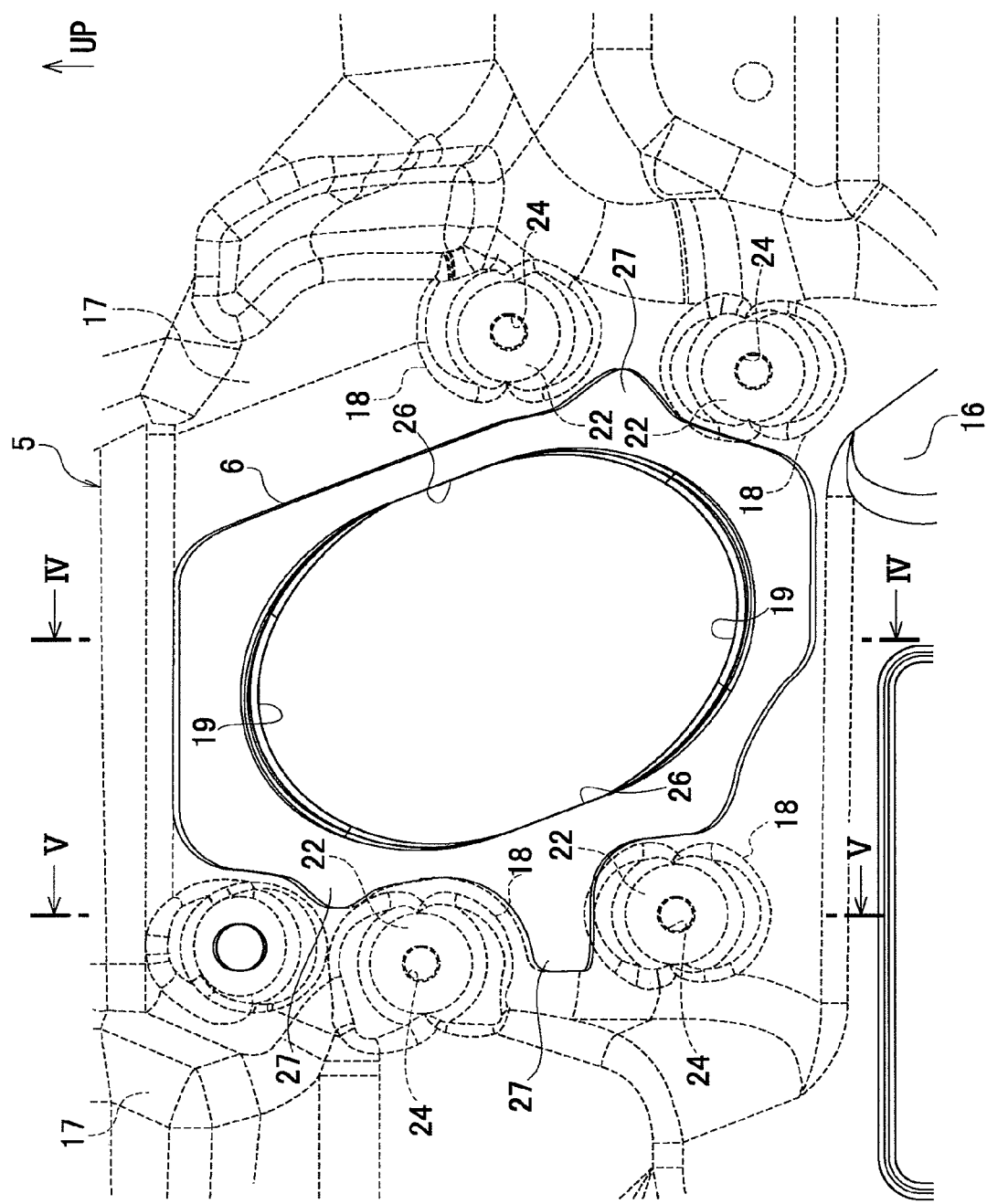
FIG. 3 is a principal part magnified perspective view of an inner panel to which a reinforcement member is fixed when viewed from inside the vehicle.
Figure 4:
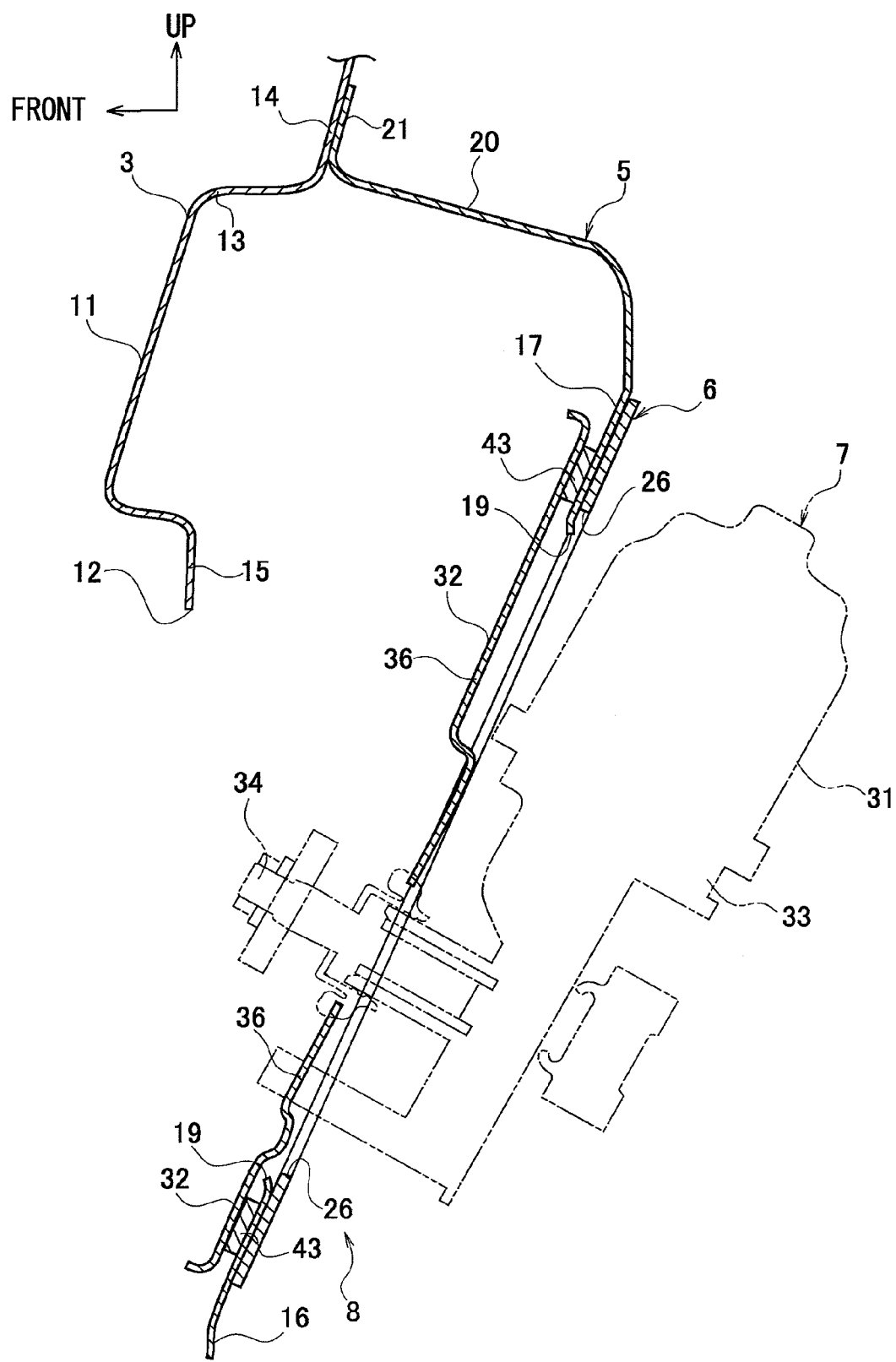
FIG. 4 is a cross section viewed from line IV-IV of FIG. 3.
Figure 5:
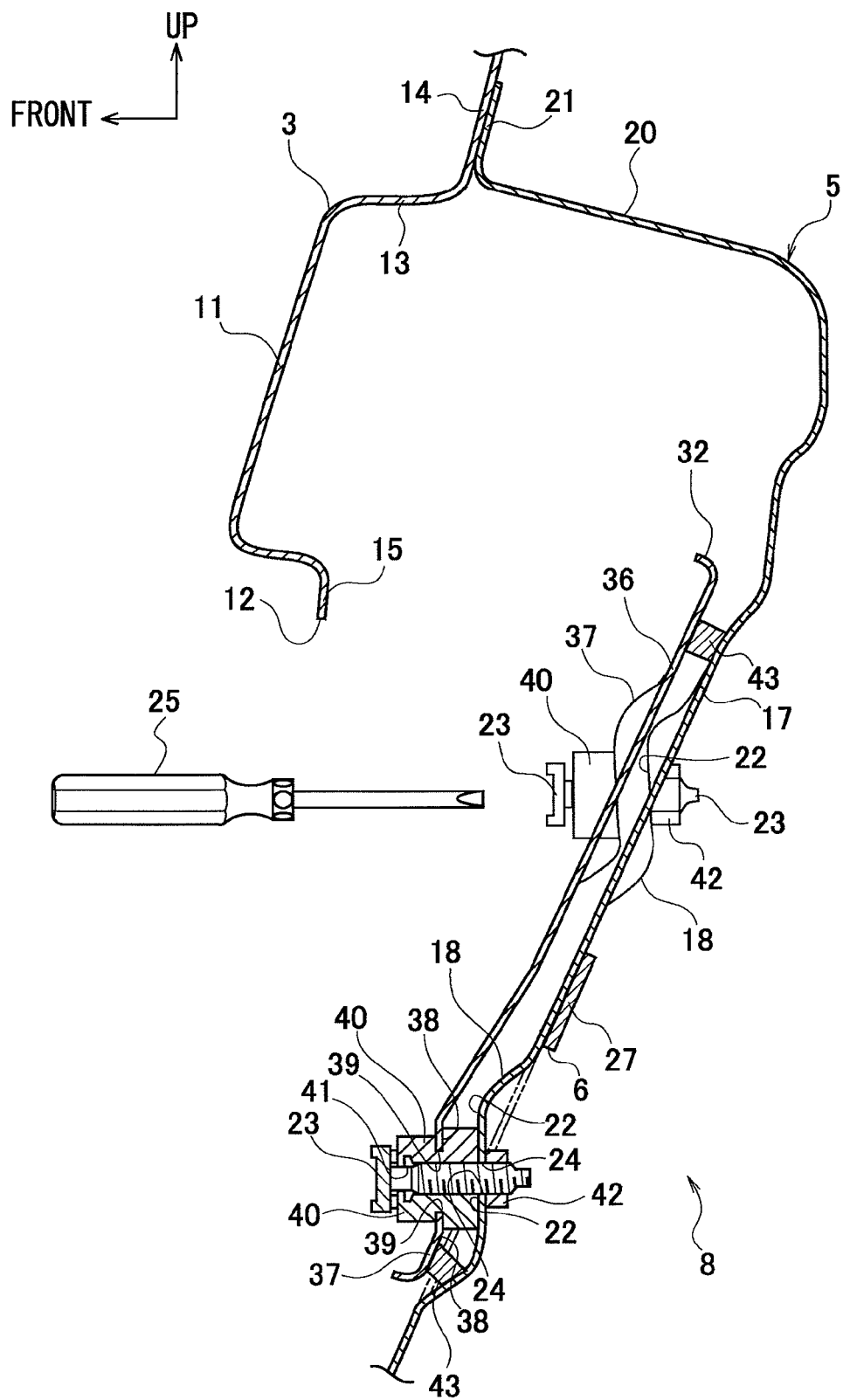
FIG. 5 is a cross section viewed from line V-V of FIG. 3.

An embodiment of the present invention is described forthwith based on the appended drawings. FIG. 1 is a perspective view of a vehicle according to an embodiment. FIG. 2 is a cross section viewed from the line II-II of FIG. 1. FIG. 3 is a principal part magnified perspective view of an inner panel to which a reinforcement member is fixed when viewed from inside the vehicle. FIG. 4 is a cross section viewed from the line IV-IV of FIG. 3. FIG. 5 is a cross section viewed from the line V-V of FIG. 3. Note that 'FRONT' in the drawings denotes the vehicle front, and 'UP' denotes the vehicle top.

As shown in FIGS. 1 and 2, a vehicle 1 according to this embodiment is a cab-over engine truck which generally has the position of the driver's seat (omitted from the drawing) in a cab 2 in front of the engine (omitted from the drawing). It includes a front body outer section 3, which is a shell-plate component in the front part of the cab 2, an approximately rectangular-shaped front panel 4, a front body inner section (body panel) 5, which is arranged facing inward in the vehicle width-direction of the front body outer section 3, a reinforcement panel 6 having a predetermined thickness, and a wiper motor unit (in-vehicle component) 7. In this embodiment, an in-vehicle component attachment structure 8 according to the present invention is constituted by the front body inner section 5 and the reinforcement panel 6.

The front body outer section 3 is arranged adjacently to the lower side of a front window glass 9, and includes a front wall 11, an aperture 12, an upper wall 13, a top flange 14, and a side end flange (omitted from the drawing).

The front wall 11 is arranged almost vertically in a curved shape curving gently toward the vehicle front. The aperture 12 is formed in an approximately rectangular shape along the vehicle width at a predetermined position of the front wall 11. The upper wall 13 is bent and extended from the top of the front wall 11 toward the vehicle rear. The upper flange 14 is bent and extended from the top of the upper wall 13 toward the vehicle upper side. The side end flange is provided on either end of the front wall 11 in the vehicle width direction.

The front window glass 9 is arranged in front of the top flange 14, and a sealing member 10 is applied along the vehicle width in a gap formed between the top flange 14 and the front window glass 9.

The front panel 4 is provided removable from the front body outer section 3, and covers the aperture 12 from the front while it is attached to the front body outer section 3. Note that the front panel 4 is not limited to being provided removable from the front body outer section 3, and may be provided closeable.

As shown in FIGS. 2 through 5, the front body inner section 5 includes a first wall 16, a second wall (general portion) 17, an attaching portion 18, holes 19, an upper wall 20, a top flange 21, and a side end flange (omitted from the drawings).

The first wall 16 is approximately flat plate-shaped and arranged almost vertically. The second wall 17 bends at the top of the first wall 16 and then extends at a slant towards the vehicle rear. The attaching portion 18 is formed in plurality (four places in this embodiment) at predetermined positions on the second wall 17, fixing brackets 32 to the wiper motor unit 7 described later. The holes 19 are formed near the multiple attaching portions 18 of the second wall 17, and are shaped allowing a main body (a part of the in-vehicle component) 31 of the wiper motor unit 7 described later to be passed through. The upper wall 20 is bent and extended from the top of the second wall 17 toward the vehicle front. The upper flange 21 is bent and extended from the front end of the upper wall 20 toward the vehicle upper side. The side end flange is provided on either end of the first wall 16 and the second wall 17 in the vehicle width direction.

The front body inner section 5 is fixed to the front body outer section 3 by welding the outer edges of the side end flange and the top flange 21 while these are in contact with the side end flange and the top flange 14 of the front body outer section 3, respectively.

As shown in FIGS. 3 and 5, each of the attaching portions has an approximately S-shaped cross section, and approximately circular planar attaching surfaces 22 to which the bracket 32 of the wiper motor unit described later can be fixed are formed on the respective front faces at the respective centers of the height thereof. Each of the attaching surfaces 22 is arranged almost vertically, and is at a slant relative to the second wall 17. Moreover, each of the attaching surfaces 22 is arranged at a position lower than an upper edge 15 of the aperture 12, which is formed in the front body outer section 3, and bolt through-holes 24 through which respective bolts 23 can be passed through almost horizontally are formed at the predetermined positions. Namely, since the aperture 12 of the front body outer section 3 is provided on an extension line out to each of the bolts 23 in the pass-through direction (fastening direction), the front body outer section 3 cannot be an obstruction when placing a fastening tool 25 on the bolts 23.

As shown in FIGS. 3 through 5, the reinforcement panel 6 has an approximately planar shape, including apertures 26 formed in approximately the same shape as the holes 19 of the second wall 17, and multiple extensions 27 extending outward from predetermined locations of the periphery thereof. The reinforcement panel 6 is fixed to the second wall 17 by welding the outer edge and the opening edge of each of the apertures 26, and the opening edge of each of the holes 19 of the second wall 17 while it is in surface contact with the rear surface of the second wall 17. In this state, the apertures 26 are arranged in the same respective positions as the holes 19 of the second wall 17, and each of the extensions 27 is arranged between two adjacent attaching portions 18 of the multiple attaching portions 18.

As shown in FIGS. 2, 3, and 5, the wiper motor unit 7 includes the main body 31, and the bracket 32 for attaching the main body 31 to the second wall 17 of the front body inner section 5.

The main body 31 is fixed to the rear side of the bracket 32 using bolts or the like, and includes a motor 33 as a source of power, and a rotatable shaft 34 for outputting rotational power of the motor 33 to the outside. A link mechanism (omitted from the drawings) or the like for converting rotational movement of the rotatable shaft 34 to longitudinally oscillating movement is attached to the tip of the rotatable shaft 34. With the main body 31 attached to the front body inner section 5 by the bracket 32, a rod (omitted from the drawings) provided to the link mechanism or the like is inserted in the front wall 11 of the front body outer section 3. Moreover, each of wiper arms 45 including a wiper blade 44 is attached to the tip of the rod where the wiper blades 44 are arranged making contact with the front window glass 9 (Refer to FIG. 1). With such structure, if the motor 33 is driven to rotate the rotatable shaft 34, the wiper arms 45 including the respective wiper blades 44 swing longitudinally, wiping the front window glass 9.

The bracket 32 includes an approximately plate-like flat plate 36 and a support 37 formed at a position of the flat plate 36 corresponding to each of the attaching portions 18 of the front body inner section 5. The support 37 has approximately the same shape (S-shaped cross section) as the attaching portions 18 of the front body inner section 5, and an attaching surface 38 in which the bracket 32 can be fixed to the attaching portions 18 of the front body inner section 5 is formed on the rear side at the center of the height thereof. Moreover, holes 39 are formed in predetermined positions of the attaching surface 38, and an approximately hollow cylindrical attachment member 40 is attached to the holes 39. The attachment member 40 is made of resin, rubber, or the like, and includes a through-hole 41 through which a bolt 23 can be passed.

As shown in FIGS. 2 through 5, attachment to the front body inner section 5 of the wiper motor unit 7 consists of first inserting the main body 31, which is prefixed to the bracket 32, in the hole 19 of the second wall 17 from the vehicle front side in a state where the front panel 4 (refer to FIG. 1) is disengaged from the front body outer section 3. Next, with the attachment member 40, which is pre-attached to the attaching surface 38 of the bracket 32, making contact with the attaching surface 22 of the front body inner section 5, the bolts 23 are passed through the respective through-holes 41 of the attachment member 40 and the respective bolt through-holes 24 of the attaching surface 22 from the vehicle front side, and nuts 42 are then attached from the vehicle rear surface of the second wall 17. The fastening tool 25 is then set to each of the bolts 23 to fasten each of them, thereby fixing the wiper motor unit 7 to the front body inner section 5. Moreover, in this fixed state, the seal member 43 is applied in the gap formed between the periphery of the bracket 32 of the wiper motor unit 7 and the second wall 17 of the front body inner section 5.

According to this embodiment as described above, the attaching portions 18 integratedly formed by bending the second wall 17 are provided on the front body inner section 5, and the attaching surface 22 at which the bracket 32 of the wiper motor unit 7 can be fastened and fixed is provided on the attaching portions 18. The reinforcement panel 6 is arranged in the vicinity of the attaching portions 18 and fixed to the rear face of the second wall 17 making surface contact therewith. The attaching surface 22 is at a slant relative to the second wall 17 at a predetermined angle in accordance with the fastening direction of the wiper motor unit 7. Namely, since the reinforcement panel 6 is arranged in a state making contact with the second wall 17 in the vicinity of the attaching portions 18 to which the wiper motor unit 7 is fastened and fixed, this reinforcement panel 6 makes it possible to reinforce the supporting strength of the wiper motor unit 7. This, therefore, allows improvement of the supporting strength of the wiper motor unit 7 for the front panel inner section 5 without arranging a separate reinforcement plate on the rear surface of the attaching portions 18.

Moreover, since the reinforcement panel 6 is arranged in a position not interfering with the attaching portions 18, the shape of the attaching portions 18 is not influenced by that of the reinforcement panel 6. Therefore, since it is possible to appropriately establish an angle of gradient for the attaching surface 22 of the front body inner section 5, the wiper motor unit 7 may be attached to the front body inner section 5 at a desired angle. Moreover, since the reinforcement panel 6 may be an approximately planar shape along the second wall 17, increase in cost necessary for manufacturing the reinforcement panel 6 may be suppressed.

The reinforcement panel 6 is arranged in a position around the holes 19 formed in the front body inner section 5 and near the attaching portions 18. Namely, since each of the attaching portions 18 and the periphery of the hole 19 of the front body inner section 5 are reinforced by the reinforcement panel 6, the supporting strength of the wiper motor unit 7 for the front body inner section 5 may be sufficiently ensured even when the hole 19 is formed in the front body inner section 5. Therefore, the main body 31 of the wiper motor unit 7 may be positioned via the hole 19 without reducing the supporting strength of the wiper motor unit 7 for the front body inner section 5.

Each of the extensions 27 of the reinforcement panel 6 is arranged between two adjacent attaching portions 18 of the multiple attaching portions 18. Therefore, the wiper motor unit 7 may be more favorably attached to the front body inner section 5 since the multiple attaching portions 18 are reinforced by the extensions 27, respectively.

Note that the attachment structure for the wiper motor unit 7 is described in this embodiment; however, this is applicable to an attachment structure for various in-vehicle components such as a wiper washer tank, an oil tank, an electric box connecting electric wiring, and the like.

Moreover, while the in-vehicle component is attached to the front body inner section 5, attachment to other various body panels is possible.

Furthermore, while the in-vehicle component (wiper motor unit 7) is attached to the body panel (front body inner section 5) with a part (main body 31) of the in-vehicle component passed through the holes 19, it may be attached to the body panel without passing the part of the in-vehicle component through the holes 19. Moreover, not forming the holes 19 in the body panel is also possible in this case.

While the bolts 23 and the nuts 42 are used as fastening members for fixing the in-vehicle component (wiper motor unit 7) to the body panel (front body inner section 5), fastening members such as rivets or the like for caulking may be used.

Moreover, while the extensions 27 are provided to the reinforcement panel 6, they may be omitted when the supporting strength of the in-vehicle component (wiper motor unit 7) for the body panel (front body inner section 5) is satisfactory.

While the embodiment according to the invention devised by the inventor(s) has been described thus far, the present invention is not limited to the descriptions and drawings of this embodiment constituting a part of the disclosure of the present invention. Namely, it should be added that other embodiments, working examples, and operational technologies devised by person(s) skilled in the art according to this embodiment are all naturally included within the scope of this invention.

INDUSTRIAL APPLICABILITY

The present invention is applicable to various vehicles to which an in-vehicle component can be attached to the body panel.

The invention claimed is:

1. An in-vehicle component attachment structure, comprising:
    a body panel comprising a general portion fixed on a vehicle side which faces an inside of the vehicle and an attaching portion integratedly formed by bending the general portion; and
    a reinforcement panel, which is arranged on an inside side of the general portion that faces the inside of the vehicle, in the vicinity of the attaching portion, and fixed, making surface contact with the inside side of the general portion, wherein
    the attaching portion comprises an attaching surface to which an in-vehicle component is fastened and fixed, and
    the attaching surface is at a slant relative to the general portion at a predetermined angle in accordance with a fastening direction of the in-vehicle component.

2. The in-vehicle component attachment structure according to claim 1, wherein
    the body panel comprises a hole formed at a predetermined position of the general portion in the vicinity of the attaching portion and through which a part of the in-vehicle component passes, and
    the reinforcement panel is arranged around the hole.

3. The in-vehicle component attachment structure according to claim 1, wherein
    the body panel comprises a plurality of the attaching portions, and
    the reinforcement panel comprises an extension extending between two adjacent attaching portions of the plurality of attaching portions.

4. The in-vehicle component attachment structure according to claim 1, wherein the reinforcement panel is arranged not to interfere with the attaching portion.

* * * * *